(12) United States Patent
Okamoto et al.

(10) Patent No.: US 9,431,917 B2
(45) Date of Patent: Aug. 30, 2016

(54) SWITCHING POWER SUPPLY INCLUDING A RECTIFIER CIRCUIT HAVING SWITCHING ELEMENTS, AND ELECTRIC POWER CONVERTER

(71) Applicant: Panasonic Intellectual Property Management Co., Ltd., Osaka (JP)

(72) Inventors: Sohei Okamoto, Osaka (JP); Goh Yamada, Osaka (JP); Daisuke Fukuda, Hyogo (JP); Takaaki Norisada, Osaka (JP); Keiji Akamatsu, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/592,323

(22) Filed: Jan. 8, 2015

(65) Prior Publication Data

US 2015/0207424 A1 Jul. 23, 2015

(30) Foreign Application Priority Data

Jan. 23, 2014 (JP) .................................. 2014-010318

(51) Int. Cl.
*H02M 5/452* (2006.01)
*H02M 3/335* (2006.01)
*H02M 1/12* (2006.01)
(Continued)

(52) U.S. Cl.
CPC ........... *H02M 3/33592* (2013.01); *H02M 1/12* (2013.01); *H02M 3/33569* (2013.01); *H02M 5/452* (2013.01); *H02M 2001/0058* (2013.01); *H02M 2001/346* (2013.01); *Y02B 70/1475* (2013.01); *Y02B 70/1491* (2013.01)

(58) Field of Classification Search
CPC ....................................................... H02M 3/335
USPC ............................................ 363/37, 126, 17
See application file for complete search history.

(56) References Cited

U.S. PATENT DOCUMENTS

| 5,625,539 A | * | 4/1997 | Nakata | .................. | H02M 3/335 363/17 |
| 6,147,935 A | * | 11/2000 | Guyett | .................. | G04G 19/10 368/204 |

(Continued)

FOREIGN PATENT DOCUMENTS

| JP | 2002-238257 | 8/2002 |
| JP | 2006-050800 | 2/2006 |

(Continued)

*Primary Examiner* — Matthew Nguyen
*Assistant Examiner* — Trinh Dang
(74) *Attorney, Agent, or Firm* — McDermott Will & Emery LLP

(57) ABSTRACT

An electric power converter includes a bridge circuit, a transformer, a rectifier circuit, and a smoothing circuit. The rectifier circuit includes a first secondary-side diode disposed in a first current path extending between one end of a secondary winding and a first terminal of the smoothing circuit, a second secondary-side diode disposed in a second current path extending between the other end of the secondary winding and the first terminal of the smoothing circuit, a third secondary-side diode, a fourth secondary-side diode, a first secondary-side switching element, and a second secondary-side switching element. The first secondary-side switching element and the second secondary-side switching element are connected in common to a first node at which the first current path and the second current path are connected to each other.

7 Claims, 8 Drawing Sheets

(51) Int. Cl.
*H02M 1/00* (2006.01)
*H02M 1/34* (2007.01)

(56) References Cited

U.S. PATENT DOCUMENTS

2006/0139823 A1* 6/2006 Shoji ................ H02M 1/34
361/56
2012/0294052 A1* 11/2012 Reddy .................. H02M 1/36
363/49
2012/0300502 A1 11/2012 Shimada et al.
2013/0163290 A1* 6/2013 Moon ............... H02M 3/33592
363/21.02
2013/0170252 A1 7/2013 Nishino et al.

FOREIGN PATENT DOCUMENTS

JP 2012-249375 12/2012
WO 2012/053307 4/2012

* cited by examiner

SWITCHING POWER SUPPLY INCLUDING A RECTIFIER CIRCUIT HAVING SWITCHING ELEMENTS, AND ELECTRIC POWER CONVERTER

CROSS REFERENCES TO RELATED APPLICATIONS

This Application claims priority to Japanese Patent Application No. 2014-010318, filed on Jan. 23, 2014, the contents of which are hereby incorporated by reference.

BACKGROUND

1. Technical Field

The present disclosure relates to a switching power supply and an electric power converter including the switching power supply.

2. Description of the Related Art

An insulation-type switching power supply typically includes an inverter on a primary side and a rectifier circuit and a smoothing circuit on a secondary side. In this configuration, a switching element in the inverter on the primary side is controlled actively to adjust the output of the switching power supply. Alternatively, a switching element disposed in the rectifying-and-smoothing circuit on the secondary side is controlled actively to adjust the output of the switching power supply (see, for example, Japanese Unexamined Patent Application Publication No. 2002-238257).

SUMMARY

An electric power converter having a switching element on its secondary side includes a large number of driving circuits compared with an electric power converter having no switching element on its secondary side, and thus there is a need for a reduction in a circuit scale or complexity of the conventional electric power converter.

The present disclosure provides a technique of reducing a circuit scale/complexity of an electric power converter having a switching element on its secondary side.

One aspect of the present disclosure provides a switching power supply comprising: a bridge circuit that converts a DC voltage to a first AC voltage; a transformer that converts the first AC voltage to a second AC voltage, the transformer including a primary winding connected to the bridge circuit and a secondary winding electromagnetically coupled with the primary winding; a rectifier circuit that rectifies the second AC voltage to generate a rectified voltage, the rectifier circuit connected to the secondary winding; and a smoothing circuit that smoothes the rectified voltage, the smoothing circuit connected to the rectifier circuit. The rectifier circuit includes a first secondary-side diode that is disposed in a first current path extending between one end of the secondary winding and a first terminal of the smoothing circuit, the first secondary-side diode allowing a first current to pass through the first secondary-side diode in a direction from the one end of the secondary winding to the first terminal of the smoothing circuit, a second secondary-side diode that is disposed in a second current path extending between the other end of the secondary winding and the first terminal of the smoothing circuit, the second secondary-side diode allowing a second current to pass through the second secondary-side diode in a direction from the other end of the secondary winding to the first terminal of the smoothing circuit, a third secondary-side diode that is disposed in a third current path extending between the one end of the secondary winding and the a second terminal of the smoothing circuit, third secondary-side diode allowing a third current to pass through the third secondary-side diode in a direction from the second terminal of the smoothing circuit to the one end of the secondary winding, a fourth secondary-side diode that is disposed in a fourth current path extending between the other end of the secondary winding and the second terminal of the smoothing circuit, the fourth secondary-side diode allowing a fourth current to pass through the fourth secondary-side diode in a direction from the second end of the smoothing circuit to the other end of the secondary winding, a first secondary-side switching element that switches a conduction of the first current flowing from the one end of the secondary winding to the first terminal of the smoothing circuit, the first secondary-side switching element disposed in the first current path, a second secondary-side switching element that switches a conduction of the second current flowing from the other end of the secondary winding to the first terminal of the smoothing circuit, the second secondary-side switching element disposed in the second current path, and a first node at which the first current path and the second current path are connected to each other. The first secondary-side switching element and the second secondary-side switching element are connected in common to the first node.

These comprehensive and specific aspects may be implemented using an apparatus, a circuit, a method, a system, and a computer program, and any combination of apparatuses, circuits, systems, methods, and computer programs.

The present disclosure allows it to achieve a reduction in circuit scale/complexity of an electric power converter including a switching element on a secondary side.

Additional benefits and advantages of the disclosed embodiments will be apparent from the specification and drawings. The benefits and/or advantages may be individually provided by the various embodiments and features of the specification and drawings, and need not all be provided in order to obtain one or more of the same.

DETAILED DESCRIPTION

Overview of Embodiments

Figure 1:
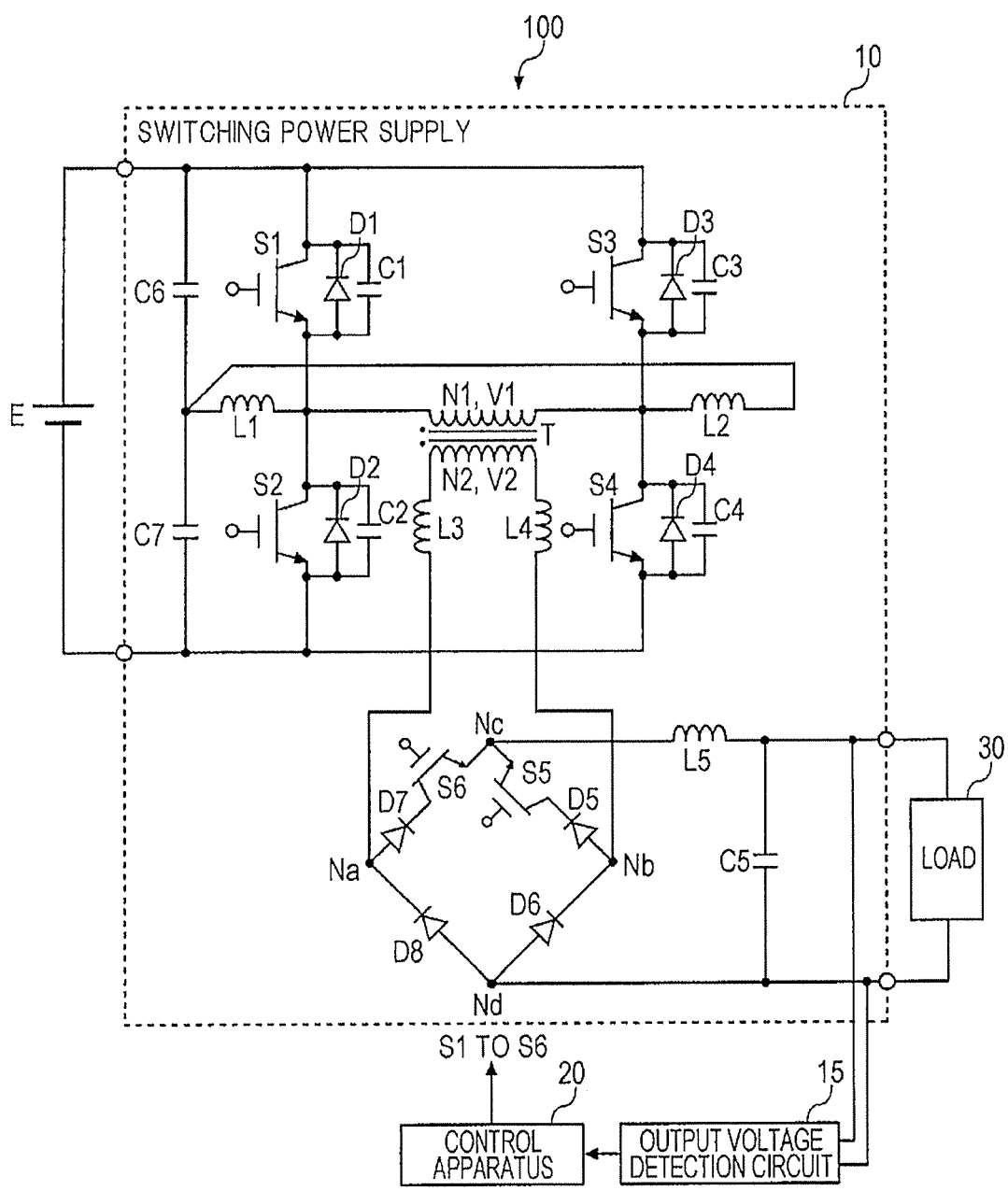
FIG. 1 is a diagram illustrating an example of a configuration of an electric power converter 100 according to a first embodiment.

According to an aspect of the present disclosure, a switching power supply includes a bridge circuit that converts a DC voltage to a first AC voltage; a transformer that converts the first AC voltage to a second AC voltage, the transformer including a primary winding connected to the bridge circuit and a secondary winding electromagnetically coupled with the primary winding; a rectifier circuit that rectifies the second AC voltage to generate a rectified voltage, the rectifier circuit connected to the secondary winding; and a smoothing circuit that smoothes the rectified voltage, the smoothing circuit connected to the rectifier circuit. The rectifier circuit includes a first secondary-side diode that is disposed in a first current path extending between one end of the secondary winding and a first terminal of the smoothing circuit, the first secondary-side diode allowing a first current to pass through the first secondary-side diode in a direction from the one end of the secondary winding to the first terminal of the smoothing circuit, a second secondary-side diode that is disposed in a second current path extending between the other end of the secondary winding and the first terminal of the smoothing circuit, the second secondary-side diode allowing a second current to pass through the second secondary-side diode in a direction from the other end of the secondary winding to the first terminal of the smoothing circuit, a third secondary-side diode that is disposed in a third current path extending between the one end of the secondary winding and the a second terminal of the smoothing circuit, third secondary-side diode allowing a third current to pass through the third secondary-side diode in a direction from the second terminal of the smoothing circuit to the one end of the secondary winding, a fourth secondary-side diode that is disposed in a fourth current path extending between the other end of the secondary winding and the second terminal of the smoothing circuit, the fourth secondary-side diode allowing a fourth current to pass through the fourth secondary-side diode in a direction from the second end of the smoothing circuit to the other end of the secondary winding, a first secondary-side switching element that switches a conduction of the first current flowing from the one end of the secondary winding to the first terminal of the smoothing circuit, the first secondary-side switching element disposed in the first current path, a second secondary-side switching element that switches a conduction of the second current flowing from the other end of the secondary winding to the first terminal of the smoothing circuit, the second secondary-side switching element disposed in the second current path, and a first node at which the first current path and the second current path are connected to each other. The first secondary-side switching element and the second secondary-side switching element are connected in common to the first node.

Because the first secondary-side switching element and the second secondary-side switching element are connected to the common node, the first secondary-side switching element and the second secondary-side switching element are made have an equal potential. Therefore, the power supply potential becomes equal for both switching elements, which makes it possible to reduce the circuit scale/complexity of the electric power converter.

In the switching power supply according to the aspect of the disclosure, for example, the rectifier circuit further may include a second node at which the third current path and the fourth current path are connected to each other. An electric potential of the first node may be higher than an electric potential of the second node.

The switching power supply according to the aspect of the disclosure may, for example, further include a fifth secondary-side diode that is disposed between the first node and the second node, the fifth secondary-side diode allowing a fifth current to pass through the fifth secondary-side diode in a direction from the second node to the first node.

In this configuration, at least part of a circulating current flowing from the second node to the first node can flow to the fifth secondary-side diode. As a result, it is possible to reduce a conduction loss caused by passing of the circulating current through the rectifier circuit.

According to an aspect of the present disclosure, an electric power converter may include, for example, the switching power supply described above, and a controller that controls the switching power supply.

In the switching power supply, the first secondary-side switching element and the second secondary-side switching element have an equal potential. This makes it possible to reduce the circuit scale/complexity of the controller, and thus it becomes possible to reduce the circuit scale/complexity of the electric power converter.

The electric power converter according to the aspect of the present disclosure may further include, for example, an output detector that detects an output from the switching power supply and outputs a detected result to the controller.

This configuration makes it possible for the controller to adjust the control of the switching power supply depending on the output of the switching power supply. As a result, it is possible to stabilize the output of the electric power converter.

In the electric power converter according to the aspect of the disclosure, for example, the bridge circuit may include a plurality of primary-side switching elements, and the controller may output a primary-side driving signal to control the plurality of primary-side switching elements, and a secondary-side driving signal to control the first secondary-side switching element and the second secondary-side switching element. The primary-side driving signal may have a first fixed duty ratio and a first fixed phase, for example. The secondary-side driving signal may have a second fixed duty ratio and a second phase that is set depending on the detection result, for example.

By controlling the secondary-size phase shift, it is possible to stabilize the output of the electric power converter.

In the electric power converter according to the aspect of the disclosure, for example, the controller may include a first driving circuit that generates the first driving signal that controls the first secondary-side switching element, a second driving circuit that generates the second driving signal that controls the second secondary-side switching element, a first power supply circuit that applies a first power supply potential to the first driving circuit and the second driving circuit, and a second power supply circuit that applies a second power supply potential lower than the first power supply potential to the first driving circuit and the second driving circuit.

An equal power supply potential is provided to both the first driving circuit and the second driving circuit. This allows a reduction in the circuit scale/complexity of the controller, and thus it is possible to reduce the circuit scale/complexity of the electric power converter.

Embodiments are described below with reference to drawings. Note that throughout all figures like parts are denoted by like reference symbols or numerals, and a duplicated description thereof is omitted.

The embodiments described below represent comprehensive or specific examples. In the embodiments described below, values, shapes, materials, components, locations of components, connection manners, waveforms, and the like are described only by way of example but not limitation. Among components in the embodiments described below, components that are not included in independent claims representing highest concepts are arbitrary components.

First Embodiment

FIG. 1 illustrates an example of a configuration of an electric power converter 100 according to a first embodiment. The electric power converter 100 includes a switching power supply 10, an output voltage detector 15, and a controller 20. The switching power supply 10 is an insulation-type DC-DC converter using a secondary-side phase shift technique. The switching power supply 10 includes a full-bridge circuit, a first coil L1, a second coil L2, a sixth capacitor C6, a seventh capacitor C7, a transformer T, a third coil L3, a fourth coil L4, a rectifier circuit 11, and a smoothing circuit 12.

The full-bridge circuit converts a DC voltage supplied from a DC power supply E to an AC voltage. The full-bridge circuit includes a first switching element S1, a second switching element S2, a third switching element S3 and a fourth switching element S4, which are connected in a bridge configuration. The full-bridge circuit includes a first arm and a second arm connected to in parallel. In FIG. 1, the first arm includes a first switching element S1 on an upper side and a second switching element S2 on a lower side. In FIG. 1, the second arm includes a third switching element S3 on an upper side and a fourth switching element S4 on a lower side. Note that the "upper side" is a side where a high potential is supplied from the DC power supply E, and the "lower side" is a side where a low potential is supplied from the DC power supply E.

The first capacitor C1 is connected in parallel to the first switching element S1. The second capacitor C2 is connected in parallel to the second switching element S2. The third capacitor C3 is connected in parallel to the third switching element S3. The fourth capacitor C4 is connected in parallel to the fourth switching element S4. The first capacitor C1 to the fourth capacitor C4 are snubber capacitors.

The first diode D1 is connected in parallel to the first switching element S1. The second diode D2 is connected in parallel to the second switching element S2. The third diode D3 is connected in parallel to the third switching element S3. The fourth diode D4 is connected in parallel to the fourth switching element S4. Note that the first diode D1 to the fourth diode D4 are connected in a reverse direction respectively to the first switching element S1 to the fourth switching element S4. Note that the "reverse direction" is, for example, a direction in which a current is allowed to pass through each diode from a lower side to an upper side, in FIG. 1.

The first switching element S1 to the fourth switching element S4 are each, for example, a semiconductor switching element. Specific examples of semiconductor switching elements include a MOSFET, an IGBT, and the like. In FIG. 1, the first switching element S1 to the fourth switching element S4 are by way of example n-channel type IGBTs. Note that the first switching element S1 and the third switching element S3 each may be a p-channel type semiconductor switching element.

In the present disclosure, the first switching element S1 to the fourth switching element S4 are used by way of example as primary-side switching elements. The first capacitor C1 to the fourth capacitor C4 are used by way of example as primary-side capacitors. The first diode D1 to the fourth diode D4 are used by way of example as primary-side diodes.

In FIG. 1, a primary-side circuit is a partial resonant circuit. In the partial resonant circuit, a current is commutated by resonance only when switching occurs. On the other hand, the partial resonant full-bridge circuit operates with no resonance during the other states.

More specifically, the primary-side circuit illustrated in FIG. 1 is a resonant pole circuit. The resonant pole circuit is capable of operating in a zero voltage switching (ZVS) mode even when a load is light. The resonant pole circuit includes the full-bridge circuit, the sixth capacitor C6, the seventh capacitor C7, the first coil L1, and the second coil L2. The sixth capacitor C6 and the seventh capacitor C7 are connected in series, and this series circuit is connected in parallel to the DC power supply E. The first coil L1 is connected between two nodes at one of which the sixth capacitor C6 and the seventh capacitor C7 are connected to each other and at the other one of which the first switching element S1 and the second switching element S2 are connected to each other. The second coil L2 is connected between two nodes at one of which the sixth capacitor C6 and the seventh capacitor C7 are connected to each other and at the other one of which the third switching element S3 and the fourth switching element S4 are connected to each other. In other words, in the resonant pole circuit illustrated in FIG. 1, the first coil L1 and the second coil L2 are connected in common to the node between the sixth capacitor C6 and the seventh capacitor C7.

The resonant pole circuit may further include an eighth capacitor C8 (not illustrated) and a ninth capacitor C9 (not illustrated). In this case, for example, the eighth capacitor C8 and the ninth capacitor are connected in series and this series circuit is connected in parallel to the DC power supply E. Furthermore, in this case, the second coil L2 is connected instead of to the node between the sixth capacitor C6 and the seventh capacitor C7 but to the node between the eighth capacitor C8 and the ninth capacitor C9.

The first coil L1 and the second coil L2 are auxiliary inductors for resonance. The sixth capacitor C6 and the seventh capacitor C7 provide currents to the first coil L1 and the second coil L2. When the first switching element S1 to fourth switching element S4 each perform switching, partial resonance occurs between the auxiliary inductor for resonance and the capacitor connected in parallel to the switching element. This makes it possible to achieve zero-voltage switching. More specifically, immediately after the first switching element S1 turns off, the presence of the first capacitor C1 causes a delay to occur in rising of the voltage across the first switching element S1. This results in a reduction in switching loss in a turning-off transition. On the other hand, at a time immediately before the first switching element S1 turns on, a current from the first coil L1 and/or the second coil L2 is flowing into the first diode D1. In this situation, a voltage across the first switching element S1 is substantially equal to 0. This results in a reduction in a switching loss that occurs when the first switching element S1 turns on. The zero-voltage switching occurs in a similar manner also in the second switching element S2 to the fourth switching element S4.

The transformer T is a high-frequency transformer. The transformer T includes a primary winding N1 and a secondary winding N2. The primary winding N1 and the secondary winding N2 are coupled by electromagnetic induction. The transformer T isolates the primary side and the secondary side from each other. The transformer T transforms the input AC voltage depending on the ratio of the number of turns of the secondary winding N2 to the number of turns of the primary winding N1. Two ends of the primary winding N1 are respectively connected to two output ends of the full-bridge circuit. That is, one end of the primary winding N1 is connected to the node between the first switching element S1 and the second switching element S2, and the other end of the primary winding N1 is connected to the node between the third switching element S3 and the fourth switching element S4. Two ends of the secondary winding N2 may be respectively connected to the third coil L3 and the fourth coil L4. The third coil L3 and the fourth coil L4 each may be leakage inductance of the secondary winding N2 or an inductor.

The rectifier circuit 11 rectifies an AC voltage input from the secondary winding N2. The rectifier circuit 11 includes a fifth diode D5, a sixth diode D6, a seventh diode D7, an eighth diode D8, a fifth switching element S5, and a sixth switching element S6. The fifth diode D5 to the eighth diode D8 are connected in a full-bridge configuration.

The rectifier circuit 11 includes a first input node Na connected to one end of the secondary winding N2 and a second input node Nb connected to the other end of the secondary winding N2. The rectifier circuit 11 also includes a first output node Nc connected to a first terminal of the smoothing circuit 12 and a second output node Nd connected to a second terminal of the smoothing circuit 12. When a current flow from the rectifier circuit 11 into the smoothing circuit 12, the first output node Nc has a higher electric potential than that of the second output node Nd. The fifth diode D5 allows a current to flow in a direction from the second input node Nb to the first output node Nc. The sixth diode D6 allows a current to flow in a direction from the second output node Nd to the second input node Nb. The seventh diode D7 allows a current to flow in a direction from the first input node Na to the first output node Nc. The eighth diode D8 allows a current to flow in a direction from the second output node Nd to the first input node Na. The fifth switching element S5 turns on/off the conduction of the current flowing in the direction from the second input node Nb to the first output node Nc. The sixth switching element S6 turns on/off the conduction of the current flowing in the direction from the first input node Na to the first output node Nc.

The fifth switching element S5 and the sixth switching element S6 turn on and off in a complementary manner except for a dead time. When the sixth switching element S6 is in an on-state, a forward current flows from the secondary winding N2, through the first input node Na, the seventh diode D7, the sixth switching element S6, and the first output node Nc, to the smoothing circuit. The forward current further flows from the smoothing circuit, through the second output node Nd, the sixth diode D6, and the second input node Nb, to the secondary winding N2. When the fifth switching element S5 is in the on-state, a reverse current flows from the secondary winding N2, through the second input node Nb, the fifth diode D5, the fifth switching element S5, and the first output node Nc, to the smoothing circuit. The reverse current further flows from the smoothing circuit, through the second output node Nd, the eighth diode D8, and the first input node Na, to the secondary winding N2.

In other words, the sixth diode D6 and the seventh diode D7 are diodes that allow the forward current from the secondary winding N2 to pass through. The fifth diode D5 and the eighth diode D8 are diodes that allow the reverse current from the secondary winding N2 to pass through. The fifth switching element S5 adjusts forward power output from the transformer T. The sixth switching element S6 adjusts reverse power output from the transformer T. The reference terminals of the fifth switching element S5 and the sixth switching element S6 are connected in common to the first output node Nc.

More specifically, the anode terminal of the seventh diode D7 is connected to the first input node Na, and the cathode terminal of the seventh diode D7 is connected to the conduction terminal of the sixth switching element S6. The anode terminal of the fifth diode D5 is connected to the second input node Nb and the cathode terminal of the fifth diode D5 is connected to the conduction terminal of the fifth switching element S5. The cathode terminal of the eighth diode D8 to the first input node Na, and the anode terminal of the eighth diode D8 is connected to the second output node Nd. The cathode terminal of the sixth diode D6 is connected to the second input node Nb, and the anode terminal of the sixth diode D6 is connected to the second output node Nd. The fifth switching element S5 is connected between the cathode terminal of the fifth diode D5 and the first output node Nc. The sixth switching element S6 is connected between the cathode terminal and the seventh diode D7 and the first output node Nc.

The fifth switching element S5 and the sixth switching element S6 may be, for example, semiconductor switching elements. Examples of semiconductor switching elements include MOSFETs, IGBTs, and the like.

In the present disclosure, the seventh diode D7 is an example of the first secondary-side diode. The fifth diode D5 is an example of the second secondary-side diode. The eighth diode D8 is an example of the third secondary-side diode. The sixth diode D6 is an example of the fourth secondary-side diode. The sixth switching element S6 is an example of the first secondary-side switching element. The fifth switching element S5 is an example of the second secondary-side switching element. In the present disclosure, the forward current is an example of the first current and the fourth current. The reverse current is an example of the second current and the third current. In the present disclosure, the current path extending between the first input node Na and the first output node Nc is also referred to as a first current path. The current path extending between the second input node Nb and the first output node Nc is also referred to as a second current path. The current path extending between the first input node Na and the second output node Nd is also referred to as a third current path. The current path extending between the second input node Nb and the second output node Nd is also referred to as a fourth current path. In other words, the first input node Na is a node at which the first current path and the third current path are connected to each other, and the second input node Nb is a node at which the second current path and the fourth current path are connected to each other. The first output node Nc is a node at which the first current path and the second current path are connected to each other, and the second output node Nd is a node at which the third current path and the fourth current path are connected to each other. The terminal of the smoothing circuit 12 connected to the first output node Nc of the rectifier circuit 11 is also referred to as the first terminal. The terminal of the smoothing circuit 12 connected to the second output node Nd of the rectifier circuit 11 is also referred to as a second terminal.

The smoothing circuit 12 smoothes the voltage rectified by the rectifier circuit 11. The smoothing circuit 12 illustrated in FIG. 1 is an LC filter including a fifth coil L5 and a fifth capacitor C5. Note that the configuration of the smoothing circuit 12 is not limited to this example. For example, in the smoothing circuit 12, the fifth coil L5 may be removed.

The output voltage detector 15 detects the output voltage of the switching power supply 10 supplied to the load 30. In FIG. 1, the output voltage detector 15 detects the voltage across the fifth capacitor C5 as the output voltage. The output voltage detector 15 may be, for example, an error amplifier. The error amplifier may be realized, for example, by a combination of an operational amplifier and a passive element. The output voltage detector 15 outputs the detection result to the controller 20. The output voltage detector 15 illustrated in FIG. 1 is an example of the output detector. Note that the output detector is not limited to this example. For example, the output detector may detect an output current or other physical properties correlated to the output voltage and/or the output current.

In the present disclosure, the voltage input to the bridge circuit is also referred to as a "DC voltage", and the voltage output from the bridge circuit is also referred to a "first AC voltage". In the present disclosure, the voltage input to the rectifier circuit is also referred to as a "second AC voltage", and and the voltage output from the rectifier circuit is also referred to as a "rectified voltage".

The controller 20 controls turning-on/off of the first switching element S1 to the sixth switching element S6, thereby driving the switching power supply 10. The controller 20 changes the phases of the fifth switching element S5 and the sixth switching element S6 adaptively depending on the detection result supplied from the output voltage detector 15. In other words, the controller 20 changes the phases of the fifth switching element S5 and the sixth switching element S6 adaptively depending on the output voltage of the switching power supply 10. As a result, the output voltage of the switching power supply 10 can be stabilized. The configuration of the controller 20 will be described in more detail.

Figure 2:
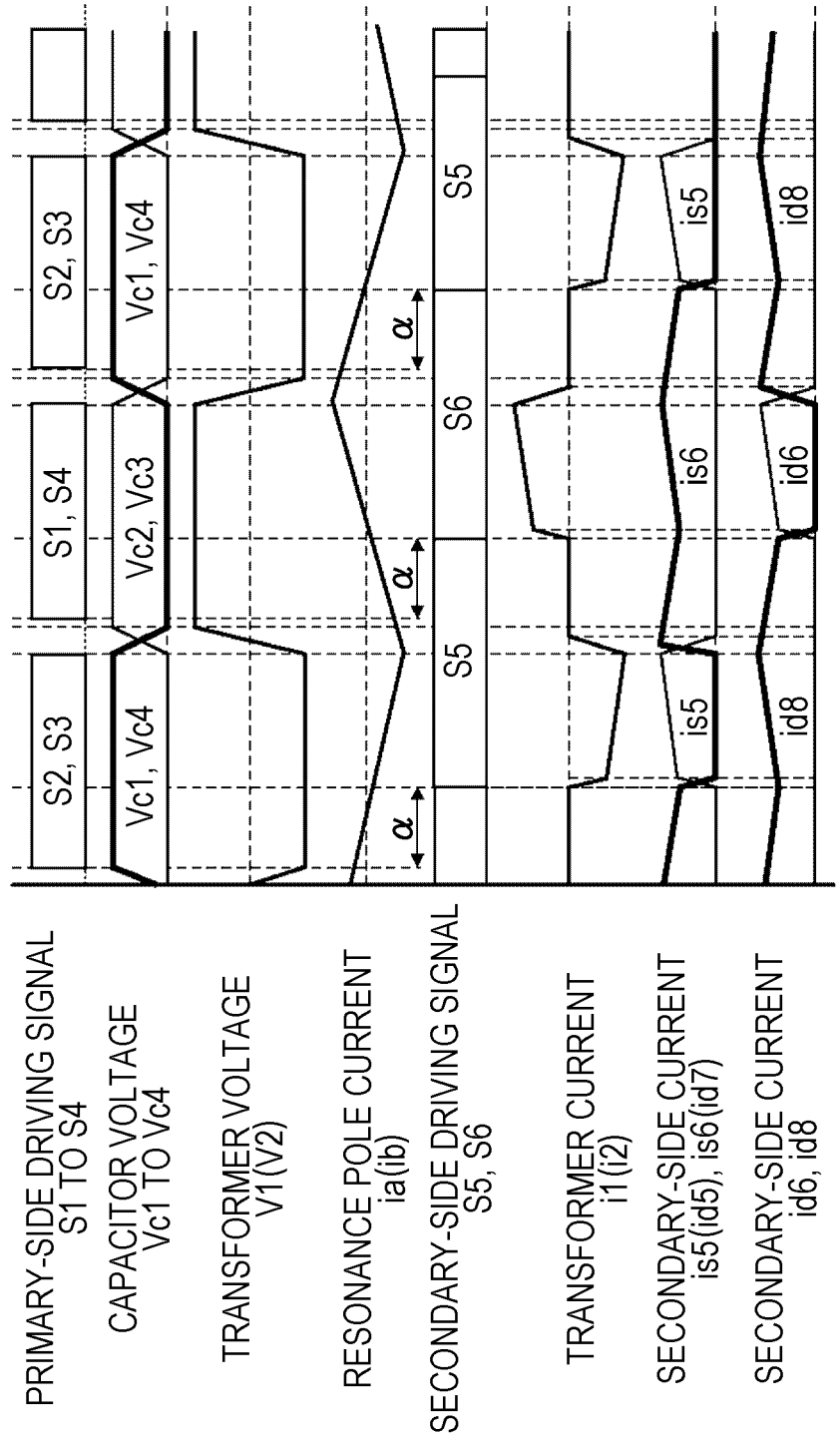
FIG. 2 is a diagram schematically illustrating an example of a method of controlling a switching power supply.

FIG. 2 schematically illustrates an example of a method of controlling the switching power supply 10 illustrated in FIG. 1.

FIG. 2 is a timing chart associated with primary-side driving signals S1 to S4 respectively input to the first switching element S1 to fourth switching element S4 and secondary-side driving signals S5 and S6 respectively input to the fifth switching element S5 and the sixth switching element S6. A reference symbol described in each rectangle indicates that a voltage of a driving signal denoted by the reference symbol is at a high level during a period indicated by the rectangle, and voltages of other driving signals are at a low level. When the voltage of a driving signal is at a high level, a switching element related to the driving signal is at an on-state, while when the voltage of the driving signal is at a low level, the switching element is at an off-state. According to the primary-side driving signal, two states of switching elements alternately appear except for dead times such that in one state, the second switching element S2 and the third switching element S3 are both in the on-state and the first switching element S1 and the fourth switching element S4 are both in the off-state, while in the other state, the first switching element S1 and the fourth switching element S4 are both in the on-state and second switching element S2 and the third switching element S3 are both in the off-state. On the other hand, according to the secondary-side driving signal, two states of switching elements alternately appear such that in one state, the fifth switching element S5 is in the on-state and the sixth switching element S6 is in the off-state while in the other state, the sixth switching element S6 is on the on-state and the fifth switching element S5 is in the off-state. In FIG. 2, periods denoted by α indicate phase delays of the secondary-side driving signal relative to the primary-side driving signal.

FIG. 2 illustrates capacitor voltages Vc1 to Vc4 across the first capacitor C1 to the fourth capacitor C4, respectively, a transformer voltage V1 across the primary winding N1 of the transformer T, a resonant pole current ia flowing through the first coil L1, a transformer current i1 flowing through the primary winding N1 of the transformer T, a secondary-side current is5 (id5) flowing through the fifth switching element S5 and the fifth diode D5, a secondary-side current is6 (id7) flowing through the sixth switching element S6 and the seventh diode D7, a secondary-side current id6 flowing through the sixth diode D6, and a secondary-side current id8 flowing through the eighth diode D8. The transformer voltage V2 across the secondary winding N2 of the transformer T has a waveform similar to the waveform of the transformer voltage V1 although the magnitude may be different between them. The transformer current i2 flowing through the secondary winding N2 of the transformer T has a waveform similar to the waveform of the transformer current i1 although the magnitude may be different between them. The resonant pole current ib flowing through the second coil L2 has a waveform similar to the waveform of the resonant pole current ia. The voltage Vc1 across the first capacitor C1 and and the voltage Vc4 across the fourth capacitor C4 are represented by thick lines as a function of time. The voltage Vc2 across the second capacitor C2 and the voltage Vc3 across the third capacitor C3 are represented by thin lines as a function of time. The current is6 (id7) flowing through the sixth switching element S6 and the seventh diode D7 on the secondary side is represented by a thick line as a function of time, and the current is5 (id5) flowing through the fifth switching element S5 and the fifth diode D5 on the secondary side is represented by a thin line as a function of time. The current id8 flowing through the eighth diode D8 on the secondary side is represented by a thick line as a function of time, and The current id6 flowing through the sixth diode D6 on the secondary side is represented by a thin line as a function of time.

The controller 20 supplies a primary-side driving signal to a control terminal of each of the first switching element S1 to the fourth switching element S4, and supplies a secondary-side driving signal to a control terminal of each of the fifth switching element S5 and the sixth switching element S6. In a case where the switching elements are FETs or IGBTs, the control terminal of each switching element is a gate terminal. On the other hand, in a case where the switching elements are non-gate bipolar transistors, the control terminal of each switching element may be a base terminal.

When the first switching element S1 and the fourth switching element S4 are in the on-state and the second switching element S2 and the third switching element S3 are in the off-state, a forward current flows through the transformer T. On the other hand, when the second switching element S2 and the third switching element S3 are in the on-state and the first switching element S1 and the fourth switching element S4 are in the off-state, a reverse current flows through the transformer T. The first switching element S1 and the fourth switching element S4 are located in a path through which the forward current is supplied to the primary winding N1. The first switching element S1 and the fourth switching element S4 function as forward switching elements on the primary side. On the other hand, the second switching element S2 and the third switching element S3 are located in a path through which the reverse current is supplied to the primary winding N1. The second switching element S2 and the third switching element S3 function as reverse switching elements on the primary side.

The primary-side driving signal has a dead time between a period in which the forward current flows and a period in which the reverse current flows. Over the dead time, the first switching element S1 to the fourth switching element S4 are all in the off-state. In the dead time, resonance occurs between a capacitance component and an inductance component in the primary-side circuit, which causes capacitors to be discharged which are connected in parallel to switching elements to be turned on next.

The controller 20 the primary side forward switching elements and the primary side reverse switching elements with a fixed duty ratio and a fixed phase. For example, the controller 20 drives the primary-side forward switching elements and the primary-side reverse switching elements so as to operate complementarily with a duty ratio of 50% except for dead times. In the switching power supply 10 illustrated in FIG. 1, the output voltage is adjusted by the switching elements on the secondary side.

A forward current flows in the rectifier circuit on the secondary side in at least a part of a period in which the forward current flows through the transformer T. For example, when the forward current flows through the transformer T and the sixth switching element S6 is in the on-state, the forward current flows in the rectifier circuit on the secondary side. In the state in which the forward current flows in the rectifier circuit, the sixth diode D6 and the seventh diode D7 are in the conductive state, the fifth diode D5 and the eighth diode D8 are in the non-conductive state, the sixth switching element S6 is in the on-state, and the fifth switching element S5 is in the off-state.

On the other hand, the reverse current flows in the rectifier circuit on the secondary side in at least a part of a period in which the reverse current flows through the transformer T. For example, in the state in which the reverse current flows through the transformer T and the fifth switching element S5 is in the on-state, the reverse current flows in the rectifier circuit on the secondary side. In the state in which the reverse current flows in the rectifier circuit, the fifth diode D5 and the eighth diode D8 are in the conductive state, the sixth diode D6 and the seventh diode D7 are in the non-conductive state, the fifth switching element S5 is in the on-state, and the sixth switching element S6 is in the off-state.

As described above, the sixth diode D6 and the seventh diode D7 block the reverse current from the secondary winding N2 but allow the forward current from the secondary winding N2 to pass through. The fifth diode D5 and the eighth diode D8 block the forward current from the secondary winding N2 but allow the reverse current from the secondary winding N2 to pass through. As a result, the AC voltage supplied from the secondary winding N2 is full-wave rectified.

The fifth switching element S5 is located in a reverse current path including the fifth diode D5 and the eighth diode D8. The fifth switching element S5 functions as a forward switching element on the secondary side. The sixth switching element S6 is located in a forward current path including the sixth diode D6 and the seventh diode D7. The sixth switching element S6 functions as a reverse switching element on the secondary side.

The controller 20 drives the fifth switching element S5 and the sixth switching element S6 with a fixed duty ratio and a varying phase. For example, the controller 20 drives the fifth switching element S5 and the sixth switching element S6 so as to operate complementarily with a duty ratio of 50% and so as to have a phase shifted adaptively depending on the output voltage of the switching power supply 10. That is, the controller 20 controls shifting of the phase on the secondary side.

More specifically, the controller 20 changes a delay of the phase of the switching elements S5 and S6 on the secondary side with respect to the phases of the switching elements S1 to S4 on the primary side. This delay of the phase is, for example, a phase difference $\alpha$ in FIG. 2. As a result, the output voltage of the switching power supply 10 is stabilized. When an increase in the output voltage of the switching power supply 10 occurs, the controller 20 increases the phase difference $\alpha$ by increasing the delay in phase of the switching elements S5 and S6 on the secondary side. As a result, a reduction occurs in electric energy output from the transformer T. On the other hand, when a reduction occurs in the output voltage of the switching power supply 10, the controller 20 reduces the phase difference $\alpha$ by advancing the phase of the switching elements S5 and S6 on the secondary side. As a result, an increase occurs in electric energy output from the transformer T. When the phase difference $\alpha$ is zero, a maximum amount of electric energy is provided by the transformer T. The greater the phase difference $\alpha$, the less amount of electric energy is provided.

Figure 3:
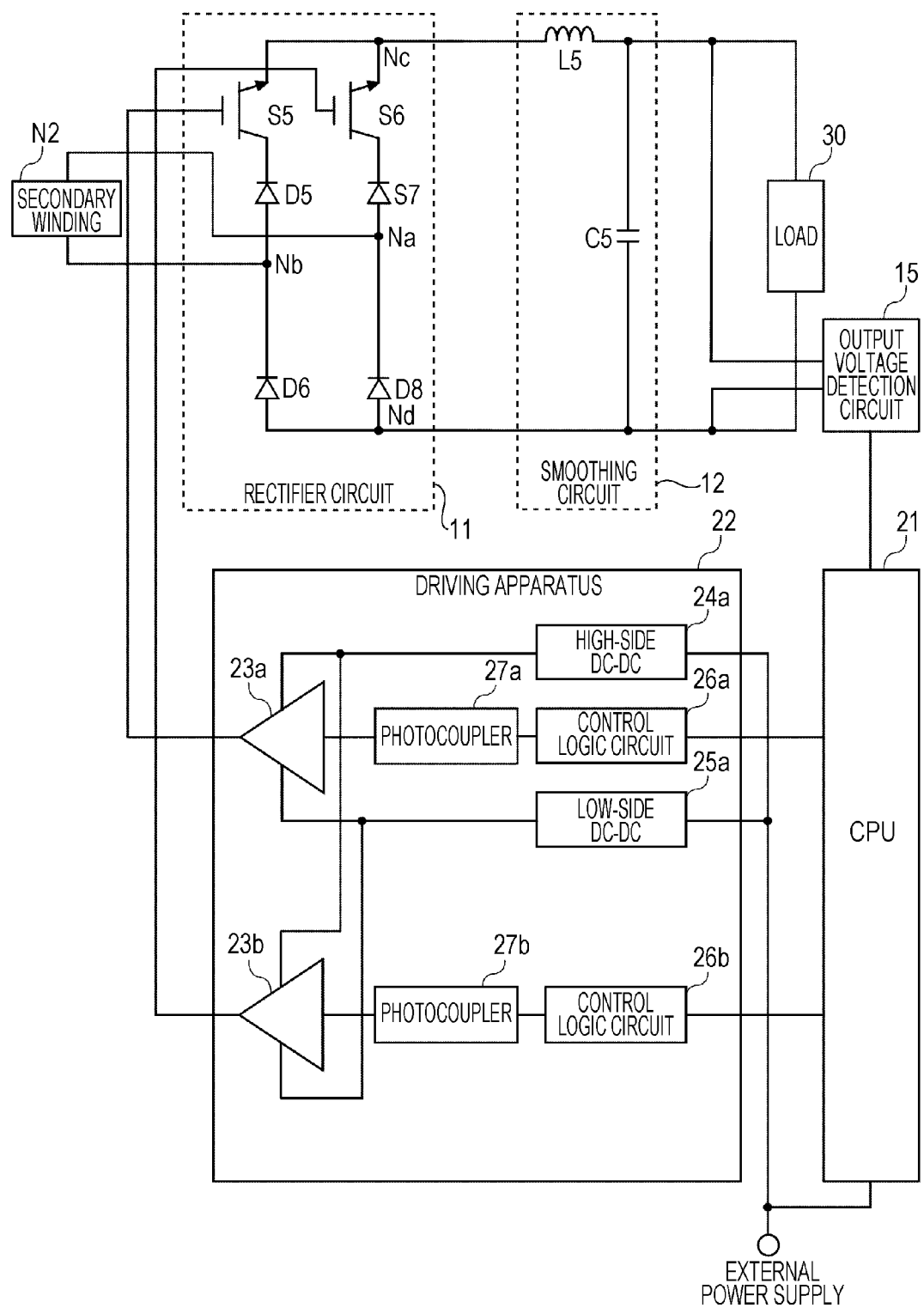
FIG. 3 is a diagram illustrating a specific example of a secondary-side circuit and a controller in the electric power converter according to the first embodiment.

FIG. 3 illustrates specific examples of the secondary-side circuit and the controller 20 of the switching power supply 10 in the electric power converter 100 illustrated in FIG. 1.

In FIG. 3, the reference terminal of the fifth switching element S5 is connected in the input terminal of the fifth coil L5. The conduction terminal of the fifth switching element S5 is connected to the cathode terminal of the fifth diode D5. The reference terminal of the sixth switching element S6 is connected to the input terminal of the fifth coil L5. The conduction terminal of the sixth switching element S6 is connected to the cathode terminal of the sixth diode D6. In a case where the switching elements are FETs, the reference terminal is the source terminal, and the conduction terminal is the drain terminal. In a case where the switching elements are bipolar transistors or IGBTs, the reference terminal is the emitter terminal and the conduction terminal is the collector terminal.

The controller 20 includes a CPU 21 and a driving apparatus 22. The driving apparatus 22 includes a first gate buffer 23a, a first high-side DC-DC converter 24a, a first low-side DC-DC converter 25a, a first control logic circuit 26a, a first photocoupler 27a, a second gate buffer 23b, a second control logic circuit 26b and a second photocoupler 27b.

The first high-side DC-DC converter 24a is an example of the first power supply circuit. The first low-side DC-DC converter 25a is an example of the second power supply circuit. A circuit unit including the first gate buffer 23a, the first control logic circuit 26a, and the first photocoupler 27a is an example of the second driving circuit. A circuit unit including the second gate buffer 23b, the second control logic circuit 26b and the second photocoupler 27b is an example of the first driving circuit. A signal output from the first driving circuit to the first secondary-side switching element is also referred to as a first driving signal. A signal output from the second driving circuit to the second secondary-side switching element is also referred to as a second driving signal.

electric power from the external power supply is supplied to the CPU 21 and the driving apparatus 22. The external power supply may be, for example, a commercial power supply or a battery. According to the signal supplied from the output voltage detector 15, the CPU 21 generates a control signal for controlling the fifth switching element S5 and a control signal for controlling the sixth switching element S6. The control signals are respectively output to the first control logic circuit 26a and the second control logic circuit 26b. The control signals are, for example, digital signals.

The first control logic circuit 26a generates a driving signal according to the input control signal. The first photocoupler 27a transmits the driving signal from the first control logic circuit 26a to the first gate buffer 23a in a state in which the first control logic circuit 26a is isolated from the first gate buffer 23a. The second control logic circuit 26b generates a driving signal in accordance with the input control signal. The second photocoupler 27b transmits the driving signal from the second control logic circuit 26b to the second gate buffer 23b in a state in which the second control logic circuit 26b is isolated from the second gate buffer 23b.

The first gate buffer 23a drives the fifth switching element S5 according to the input driving signal. The output terminal of the first gate buffer 23a is connected to the control terminal of the fifth switching element S5 via a current limiter (not illustrated). The current limiter is, for example, gate resistance. The first gate buffer 23a is, for example, an inverter including a series connection of a p-channel MOSFET and an n-channel MOSFET.

The second gate buffer 23b drives the sixth switching element S6 according to the input driving signal. The output terminal of the second gate buffer 23b is connected to the control terminal of the sixth switching element S6 via a current limiter (not illustrated). The current limiter is, for example, gate resistance. The second gate buffer 23b is, for example, an inverter including a series connection of a p-channel MOSFET and an n-channel MOSFET.

The first high-side DC-DC converter 24a generates a high-side power supply potential from the external power supply. The first low-side DC-DC converter 25a generates a low-side power supply potential from the external power supply. The first high-side DC-DC converter 24a and the first low-side DC-DC converter 25a each may be, for example, a step-down chopper. For example, in a case where the first gate buffer 23a is an inverter, the high-side power supply potential is applied to the source terminal of the p-channel MOSFET, and the low-side power supply potential is applied to the source terminal of the n-channel MOSFET.

The first high-side DC-DC converter 24a generates, for example, a control potential of +15 V with respect to the reference potential of the fifth switching element S5. The first low-side DC-DC converter 25a generates, for example, a control potential of −5 V with respect to the reference potential of the fifth switching element S5. In this case, a power supply voltage of 20 V is provided to control the first gate buffer 23a and the second gate buffer 23b. However, the values of the power supply voltage, the reference potential, and the control potential are not limited to those described above, but the values may be properly selected depending on the type and/or the specifications of the fifth switching element S5. Note that the reference potential is the source potential or the emitter potential, and the control potential is the gate potential.

The fifth switching element S5 and the sixth switching element S6 are connected in common to the first output node Nc as illustrated in FIG. 1 and FIG. 3. Therefore, the same reference potential is provided to the fifth switching element S5 and the sixth switching element S6. As a result, the same high-side power supply potential is provided to the first gate buffer 23a and the second gate buffer 23b. Similarly, the same low-side power supply potential is provided to the first gate buffer 23a and the second gate buffer 23b. That is, the first high-side DC-DC converter 24a supplies the high-side power supply potential to the first gate buffer 23a and the second gate buffer 23b. Similarly, the first low-side DC-DC converter 25a supplies the low-side power supply potential to the first gate buffer 23a and the second gate buffer 23b.

Figure 4:
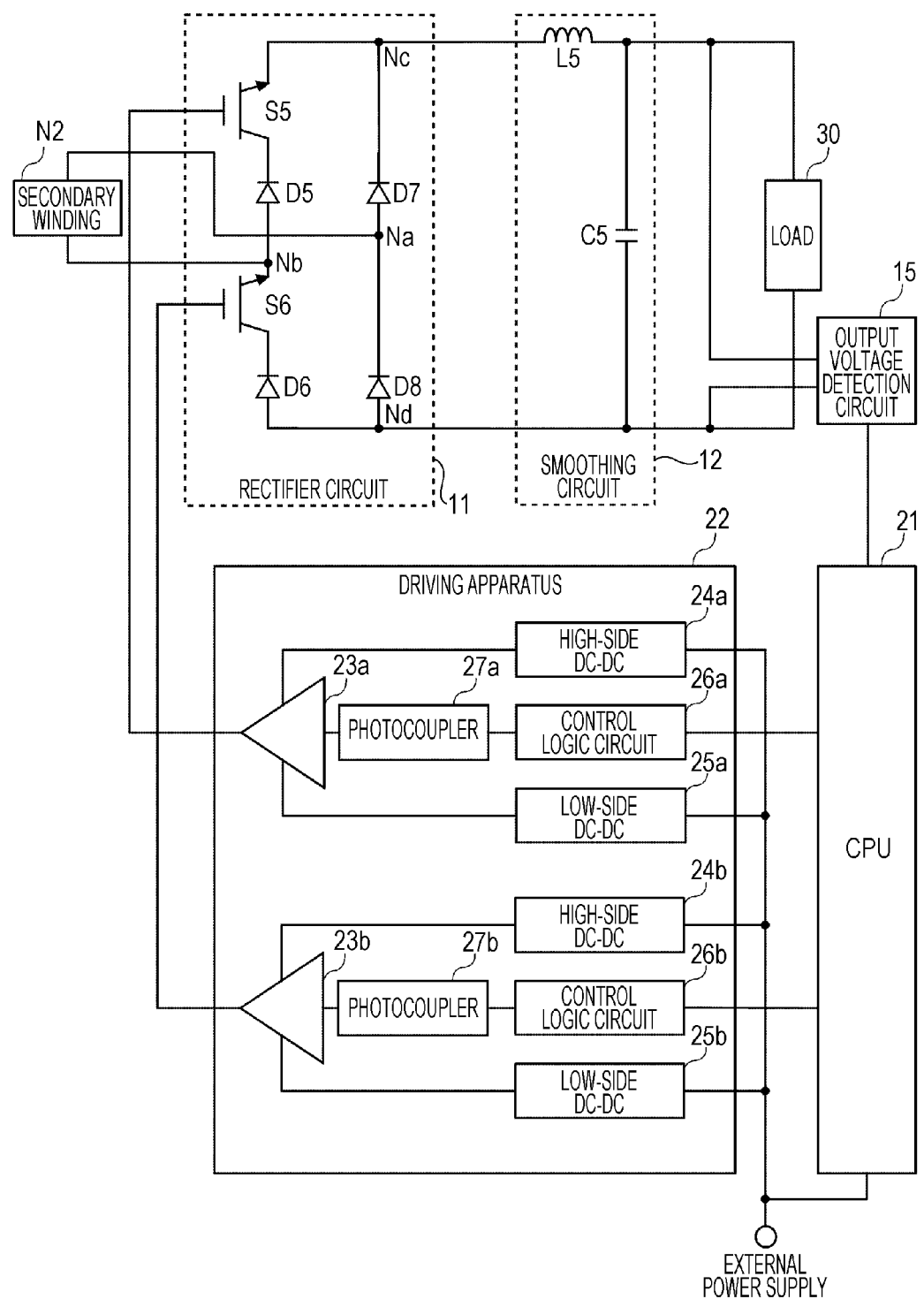
FIG. 4 is a diagram illustrating a specific example of a secondary-side circuit and a controller in an electric power converter according to a comparative example.

FIG. 4 illustrates a comparative example in terms of a secondary-side circuit and a controller 20 of the switching power supply 10. A rectifier circuit 11 in this comparative example is different from the rectifier circuit 11 illustrated in FIG. 3 in that the sixth switching element S6 is disposed at a different location. Therefore, in the comparative example, the reference potential of the fifth switching element S5 and the reference potential of the sixth switching element S6 are different from each other. In this case, the power supply potential supplied to the first gate buffer 23a and the power supply potential supplied to the second gate buffer 23b are different from each other. Therefore, as illustrated in FIG. 4, in addition to the first high-side DC-DC converter 24a and the first low-side DC-DC converter 25a, the second high-side DC-DC converter 24b and the second low-side DC-DC converter 25b are further provided. Thus, the driving apparatus 22 in the comparative example results in an increase in circuit scale/complexity and an increase in cost.

On the other hand, according to the first embodiment, the single power supply circuit is used in common to generate the power supply potential for both the first gate buffer 23a and the second gate buffer 23b. Thus, a reduction in the number of parts of the driving apparatus 22 and a reduction in cost are achieved. Furthermore, it is possible to reduce the total circuit scale/complexity of the electric power converter 100.

Note that the fifth switching element S5 may be connected between the anode terminal of the sixth diode D6 and the second output node Nd, and the sixth switching element S6 may be connected between the anode terminal of the eighth diode D8 and the second output node Nd. In this configuration, the fifth switching element S5 and the sixth switching element S6 are connected in common to the second output node Nd. That is, the reference potential is provided in common to both the fifth switching element S5 and the sixth switching element S6. In this case, for example, the fifth switching element S5 and the sixth switching element each has no parasitic diode whose forward is a direction from the source terminal to the drain terminal. For example, the fifth switching element S5 and the sixth switching element each blocks a current in a direction from the source terminal to the drain terminal, or the collector terminal, in the off-state.

Second Embodiment

Figure 5:
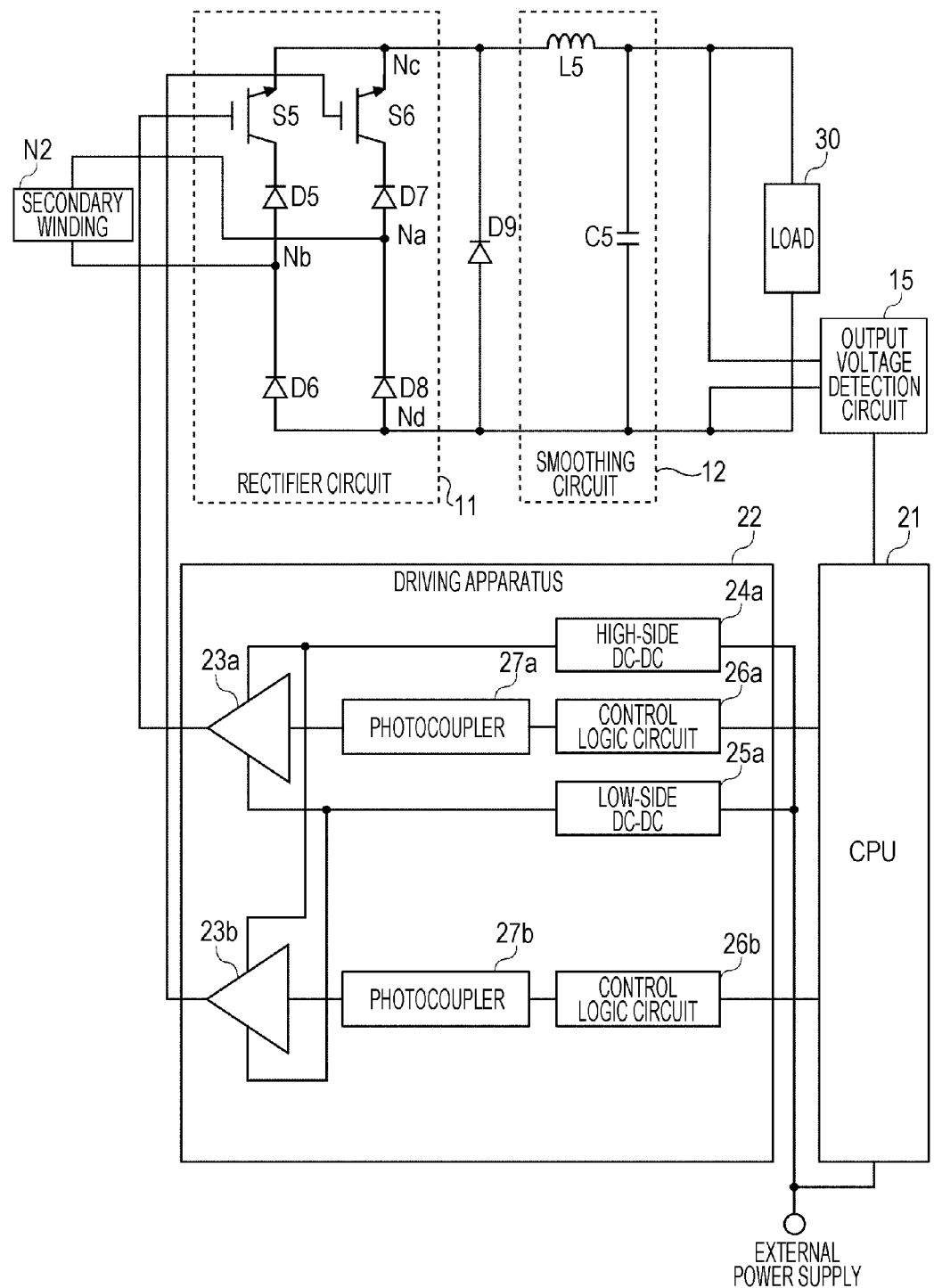
FIG. 5 is a diagram illustrating a specific example of a secondary-side circuit and a controller in the electric power converter according to the second embodiment.

FIG. 5 illustrates a specific example of a configuration of the secondary-side circuit and the controller 20 of the switching power supply 10 in the electric power converter 100 according to a second embodiment. The electric power converter 100 according to the second embodiment includes a ninth diode D9 in addition to the parts of the electric power converter 100 according to the first embodiment. The anode terminal of the ninth diode D9 is connected to the low-potential-side input terminal of the smoothing circuit 12 and the cathode terminal of the ninth diode D9 is connected to the high-potential-side input terminal of the smoothing circuit 12. The ninth diode D9 forms a circulating current path that provides a bypath for the current flowing in the rectifier circuit 11.

In the following discussion, it is assumed that the electric power converter 100 according to the first embodiment illustrated in FIG. 3 is controlled by the method described above with reference to FIG. 2. In the following discussion, a period in which a current flows through a path closed only in the secondary-side circuit is also referred to as a local-closed-path circulation period. This path corresponds to, for example, a path that does not pass through the secondary winding N2 of the transformer T. In the control method described above with reference to FIG. 2, the fifth switching element S5 and the sixth switching element S6 are turned on and off in a complementary manner. Therefore, either one of the fifth switching element S5 and the sixth switching element S6 is in the on-state. Thus either one of two current paths between the first output node Nc and the second output node Nd is in an on-state, wherein one current path passes through the sixth diode D6, the fifth diode D5, and the fifth switching element S5, and the other current path passes through the eighth diode D8, the seventh diode D7, and the sixth switching element S6. Thus, during the local-closed-path circulation period, a circulating current can flow through the current paths.

When the circulating current passes through a switching element, a conduction loss occurs. For example, in a case where the load 30 is a large-current load, flowing of a large circulating current causes the fifth switching element S5 or the sixth switching element S6 to have a large loss. Let it be assumed, for example, that the forward voltage drop Vf of each of the fifth diode D5 to the eighth diode D8 is equal to 0.5 V, the saturated voltage Vce(sat) of each of the fifth switching element S5 and the sixth switching element S6 is equal to 1.0 V, and the circulating current is equal to 1.0 A. In the case of the comparative example illustrated in FIG. 4, a loss of 1.0 W occurs when the circulating current flows through the current path passing through the eighth diode D8 and the seventh diode D7. On the other hand, in a case where the circulating current flows through a current path passing though two diodes and one switching element as illustrated in FIG. 3, a loss of 2.0 W occurs. As described above, the loss increases as the current increases.

On the other hand, in the electric power converter 100 according to the second embodiment, there is a current path that is connected in parallel to the rectifier circuit 11 and that passes through the ninth diode D9. In this case, for example, when the forward voltage drop Vf of the ninth diode D9 is equal to 0.4 V, a loss of 0.4 W occurs when the circulating current flows through the ninth diode D9. Therefore, in the electric power converter 100 according to the second embodiment, a great reduction in the loss is achieved compared with that in the electric power converter 100 according to the first embodiment.

When there are a plurality of current paths in parallel, a current flows preferentially through a path having a low forward voltage drop Vf. Therefore, by designing the ninth diode D9 to have a small forward voltage drop Vf, it is possible to make the circulating current flow through the ninth diode D9.

As described above, according to the second embodiment, the provision of the ninth diode D9 makes it possible to reduce the conduction loss in the local-closed-path circulation period. In the electric power converter 100 according to the second embodiment, the provision of the ninth diode D9 may cause an increase in the circuit scale/complexity compared with the electric power converter 100 according to the first embodiment. However, the influence of the increase in the circuit scale/complexity caused by the ninth diode D9 is less than the advantage obtained by the reduction in the circuit scale/complexity by sharing the power supply circuit.

Note that the driving signal that drives the fifth switching element S5 and the sixth switching element S6 may include a dead time. In this case, the existence of the ninth diode D9 ensures the local-closed-path circulation period in the dead time.

Examples of Applications

The electric power converter 100 according to the first embodiment or second embodiment may be used in a wide variety of applications. For example, the electric power converter 100 may be used in a power supply that needs to have high efficiency in power conversion and high input-output isolation such as a power supply for use in a power storage system, a vehicle, a charger, a data center, and the like.

Figure 6:
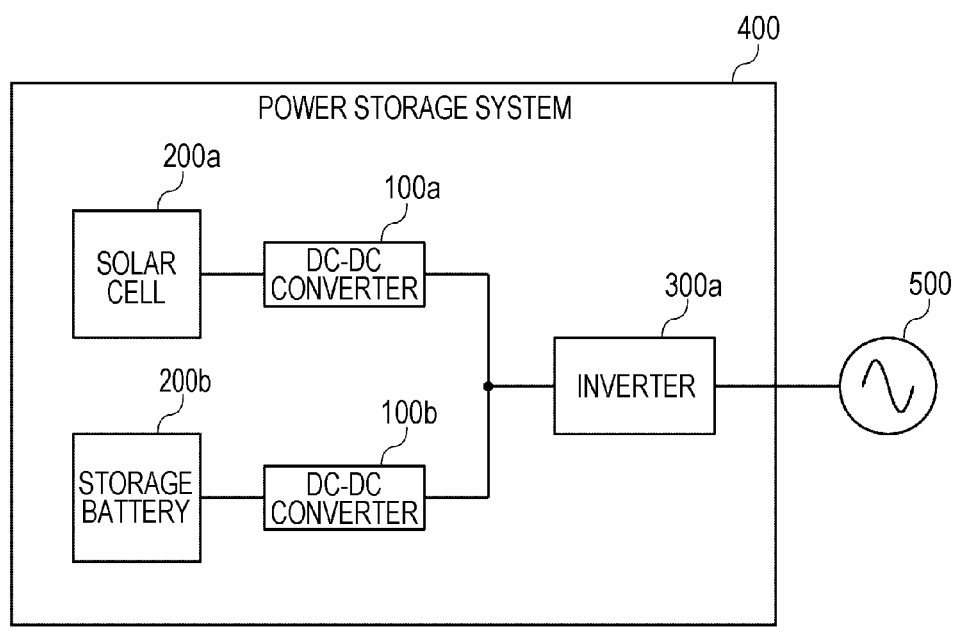
FIG. 6 is a diagram illustrating an example of a configuration of a power storage system including the electric power converter according to the first embodiment and/or second embodiment.

FIG. 6 illustrates an example of a configuration of a power storage system 400 including the electric power converter 100 according to the first embodiment and/or the second embodiment. The power storage system 400 illustrated in FIG. 6 includes a solar cell 200a, a storage battery 200b, a DC-DC converter 100a, a DC-DC converter 100b, and an inverter 300a. The storage battery 200b may be a stationary storage battery or a portable storage battery, such as an in-vehicle storage battery. DC electric power generated by the solar cell 200a is converted by the DC-DC converter 100a into DC electric power with a specified particular voltage. The resultant DC electric power is then converted by the inverter 300a into AC power and output to a system 500. Otherwise, the DC electric power is converted by the DC-DC converter 100b into DC electric power with a battery voltage and stored in the storage battery 200b. At least one of the DC-DC converter 100a and the DC-DC converter 100b includes the electric power converter 100 according to the first embodiment or the second embodiment.

Note that the storage battery 200b and the DC-DC converter 100b may not be provided. In this case, a photovoltaic power system having no power storage function is achieved. Alternatively, the solar cell 200a and the DC-DC converter 100a may not be provided. In this case, a power storage system having no power generation function is achieved.

Figure 7:
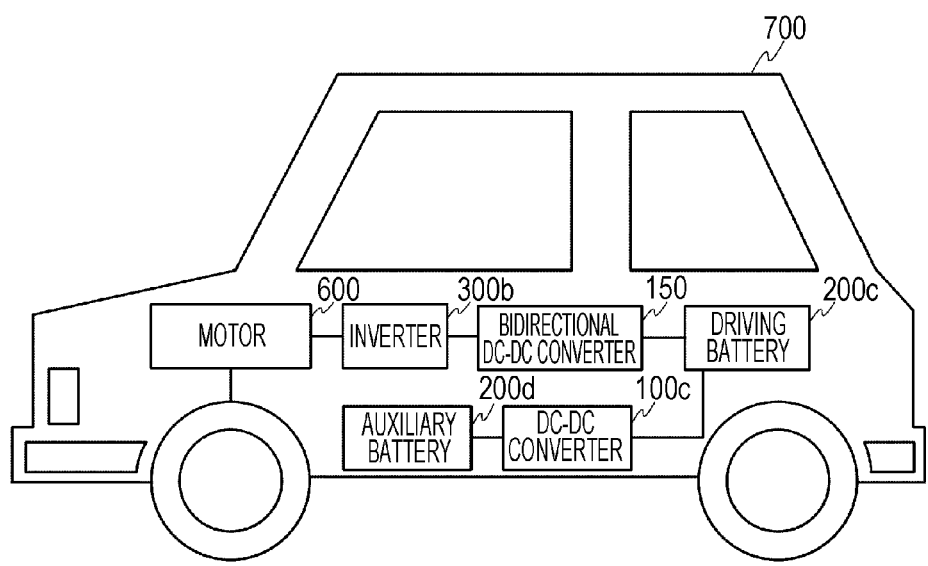
FIG. 7 is a diagram illustrating an example of a configuration of a vehicle including the electric power converter according to the first embodiment and/or second embodiment.

FIG. 7 illustrates an example of a configuration of a vehicle 700 including the electric power converter 100 according to the first embodiment and/or the second embodiment. The vehicle 700 illustrated in FIG. 7 is, for example, a hybrid vehicle (HV), a plug-in hybrid vehicle (PHV), or an electric vehicle (EV), having a motor 600 for driving the vehicle 700. The motor 600 may be a self-propelling high-output motor or a drive-assist motor disposed on a mild hybrid car. The motor 600 is typically an AC synchronous motor.

The vehicle 700 illustrated in FIG. 7 includes a drive battery 200c, an auxiliary battery 200d, a DC-DC converter 100c, a bidirectional DC-DC converter 150, an inverter 300b, and a motor 600. The drive battery 200c may be, for example, a battery such as a lithium-ion battery, a nickel hydride battery, or the like. In a power running state, the bidirectional DC-DC converter 150 converts DC electric power supplied from the drive battery 200c into DC electric power with a specified particular voltage, and outputs the resultant DC electric power to the inverter 300b. The inverter 300b converts the DC electric power supplied from the bidirectional DC-DC converter 150 into AC power and supplies the resultant AC power to the motor 600. In a regenerating operation, the inverter 300b converts AC power generated based on breaking energy into DC electric power and outputs the generated AC power to the bidirectional DC-DC converter 150. The bidirectional DC-DC converter 150 converts the DC electric power supplied from the inverter 300b into DC electric power with a battery voltage thereby charging the drive battery 200c.

The auxiliary battery 200d is, for example, a lead-acid battery with an output voltage of 12 V. In the mild hybrid vehicle, the drive battery 200c is designed, for example, to have an output voltage of 48 V. The 12-V system connected to the auxiliary battery 200d is connected, via the DC-DC converter 100c, to the 48-V system connected to the drive battery 200c. The DC-DC converter 100c steps up the voltage of the auxiliary battery 200d to the voltage of the drive battery 200c. In this configuration, when the capacity of the drive battery 200c does not satisfy a required value, the auxiliary battery 200d may supply electric power to the motor 600. The DC-DC converter 100c includes the electric power converter 100 according to the first embodiment and/or the second embodiment.

Figure 8:
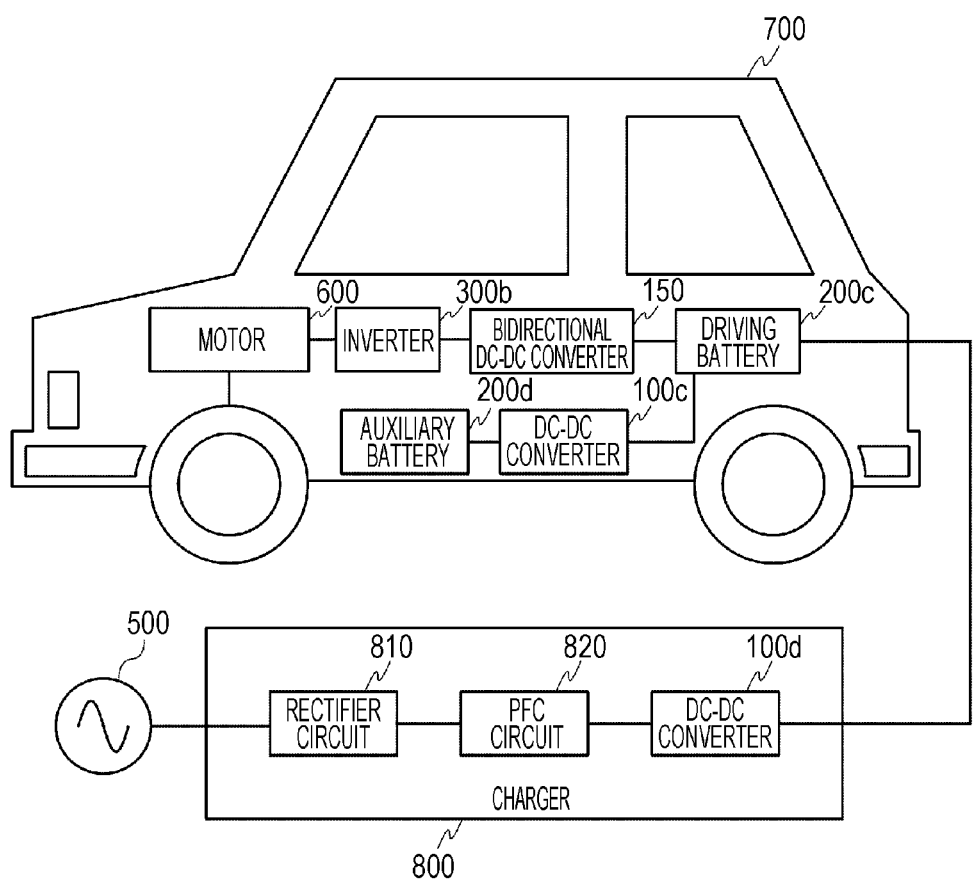
FIG. 8 is a diagram illustrating an example of a configuration of a charger including the electric power converter according to the first embodiment and/or second embodiment.

FIG. 8 illustrates an example of a configuration of the charger 800 including the electric power converter 100 according to the first embodiment and/or the second embodiment. The vehicle 700 illustrated in FIG. 8 has a plug-in charging function in addition to the parts included in the vehicle illustrated in FIG. 7. The charger 800 includes a rectifier circuit 810, a PFC circuit 820, and a DC-DC converter 100d. The rectifier circuit 810 rectifies an AC voltage supplied from the system 500. The PFC circuit 820 improves the power factor of rectified electric power. The DC-DC converter 100d converts the voltage input from the PFC circuit 820 to a charging voltage. The DC-DC converter 100d includes the electric power converter 100 according to the first embodiment and/or the second embodiment. The charger 800 may a charger, for example, a quick charger, disposed outside the vehicle as illustrated in FIG. 8 or may be an in-vehicle charger disposed on the vehicle 700.

As described above, the electric power converter 100 according to the first embodiment and/or the second embodiment may be used as a DC-DC converter that may be disposed inside the power storage system 400, inside the vehicle 700, or inside the charger 800. This make is possible to build a low-loss and small-size power system.

Various embodiments have been described above by way of example. The present disclosure is not limited to the embodiments described above. It will be apparent to those skilled in the art that various combinations of constituent elements described above, various combinations of control steps described above, and various modifications thereof fall in the scope of the disclosure.

For example, the inverter on the primary side of the switching power supply 10 may not be of the full-bridge type but may be of the half-bridge type. The output of the switching power supply 10 may be adjusted not by shifting the phases of the fifth switching element S5 and the sixth switching element S6 but by changing the duty ratios of the fifth switching element S5 and the sixth switching element S6.

The first coil L1 and the second coil L2 each may be leakage inductance of the primary winding N1. The first capacitor C1 to the fourth capacitor C4 may not be snubber capacitors, but each may be parasitic capacitance of corresponding one of the first switching element S1 to the fourth switching element S4. The first diode D1 to the fourth diode D4 may respectively be parasitic diodes of the first switching element S1 to the fourth switching element S4.

The present disclosure may be applied to a DC-DC converter used in a power storage system, a vehicle, and the like.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. A switching power supply comprising:
   a bridge circuit that converts a DC voltage to a first AC voltage;
   a transformer that converts the first AC voltage to a second AC voltage, the transformer including a primary winding connected to the bridge circuit and a secondary winding electromagnetically coupled with the primary winding;
   a rectifier circuit that rectifies the second AC voltage to generate a rectified voltage, the rectifier circuit connected to the secondary winding; and
   a smoothing circuit that smoothes the rectified voltage, the smoothing circuit connected to the rectifier circuit, wherein:
   the rectifier circuit includes:
      a first secondary-side diode that is disposed in a first current path extending between one end of the secondary winding and a first terminal of the smoothing circuit, the first secondary-side diode allowing a first current to pass through the first secondary-side diode in a direction from the one end of the secondary winding to the first terminal of the smoothing circuit,
      a second secondary-side diode that is disposed in a second current path extending between the other end of the secondary winding and the first terminal of the smoothing circuit, the second secondary-side diode allowing a second current to pass through the second secondary-side diode in a direction from the other end of the secondary winding to the first terminal of the smoothing circuit,
      a third secondary-side diode that is disposed in a third current path extending between the one end of the secondary winding and the a second terminal of the smoothing circuit, third secondary-side diode allowing a third current to pass through the third secondary-side diode in a direction from the second terminal of the smoothing circuit to the one end of the secondary winding,
      a fourth secondary-side diode that is disposed in a fourth current path extending between the other end of the secondary winding and the second terminal of the smoothing circuit, the fourth secondary-side diode allowing a fourth current to pass through the fourth secondary-side diode in a direction from the second end of the smoothing circuit to the other end of the secondary winding, a first secondary-side switching element that switches a conduction of the first current flowing from the one end of the secondary winding to the first terminal of the smoothing circuit, the first secondary-side switching element disposed in the first current path in series with the first secondary-side diode, a second secondary-side switching element that switches a conduction of the second current flowing from the other end of the secondary winding to the first terminal of the smoothing circuit, the second secondary-side switching element disposed in the second current path in series with the second secondary-side diode, and a first node at which the first current path and the second current path are connected to each other, the first node being electrically coupled to the first terminal, and the first secondary-side switching element and the second secondary-side switching element are connected in common to the first node.

2. The switching power supply according to claim 1, wherein:

the rectifier circuit further includes a second node at which the third current path and the fourth current path are connected to each other, the second node being electrically coupled to the second terminal, and an electric potential of the first node is higher than an electric potential of the second node.

3. An electric power converter comprising:
the switching power supply according to claim 1; and
a controller that controls the switching power supply.

4. The switching power supply according to claim 2, further comprising a fifth secondary-side diode that is disposed between the first node and the second node, the fifth secondary-side diode allowing a fifth current to pass through the fifth secondary-side diode in a direction from the second node to the first node.

5. The electric power converter according to claim 3, further comprising an output detector that detects an output from the switching power supply and outputs a detected result to the controller.

6. The electric power converter according to claim 3, wherein the controller includes a first driving circuit that generates the first driving signal that controls the first secondary-side switching element, a second driving circuit that generates the second driving signal that controls the second secondary-side switching element, a first power supply circuit that applies a first power supply potential to the first driving circuit and the second driving circuit, and a second power supply circuit that applies a second power supply potential lower than the first power supply potential to the first driving circuit and the second driving circuit.

7. The electric power converter according to claim 5, wherein:

the bridge circuit includes a plurality of primary-side switching elements, and the controller outputs a plurality of primary-side driving signals to control the plurality of primary-side switching elements and a plurality of secondary-side driving signals to control the first secondary-side switching element and the second secondary side switching element, the plurality of primary-side driving signals having a first fixed duty ratio and a first fixed phase, the plurality of secondary-side driving signals having a second fixed duty ratio and a second phase that is set depending on the detection result.

* * * * *